Patented Mar. 16, 1943

2,314,125

UNITED STATES PATENT OFFICE 2,314,125

PHARMACEUTICAL COMPOSITION

Arthur F. Coca, Oradell, N. J., assignor to Lederle Laboratories, Inc., New York, N. Y., a corporation of Delaware No Drawing. Application September 25, 1940, Serial No. 358,293

4 Claims. (Cl. 167—58)

This invention relates to pharmaceutical compositions and more particularly relates to pharmaceutical compositions containing cadmium salts and which compositions are effective as fungicides and also as deodorants.

In accordance with the present invention cadmium salts are employed either alone or in conjunction with other materials for decreasing body odors and also for the treatment of fungus infections.

One object of this invention is to provide a composition for the treatment and prevention of infections, such as those produced by the fungi trichophyton and monilia.

Another object of this invention is to provide a preparation suitable for neutralizing odors arising in the various body secretions, as for example perspiration.

Another object of this invention is to provide a trichophytic composition containing a cadmium salt, which is effective for penetrating and establishing intimate contact with the mycelium and spores of the fungus causing the infection and to rapidly correct the infected condition.

Another object of this invention is to provide a deodorant composition containing a cadmium salt, which is non-irritating and which effectively prevents or destroys body odors.

In attaining the objects of the present invention I prefer to use a soluble cadmium salt, such as cadmium chloride, cadmium bromide, cadmium acetate, cadmium salicylate, cadmium benzoate and the like which are incorporated into compositions.

Suitable compositions may be in the form of dusting powders comprising a mixture of a cadmium salt with an inert substance, such as talc, and which may also have present an antiseptic material, such as boric acid, and various other substances, such as zinc stearate or a powdered form of a wetting agent. Suitable compositions may likewise be those in which the cadmium salt is incorporated with solid or semi-solid substances; such as soaps, ointments, vanishing creams and similar compositions for topical use.

In a preferred form the cadmium salt is an ingredient in a liquid composition comprising an aqueous alcoholic solution which also contains a small amount of a wetting agent and may or may not contain some added color and perfume.

In the above compositions the exact quantity or percentage of the cadmium salt present will vary somewhat with the form of the composition used, the cadmium salt employed, and the particular use to which the composition is to be put. In many instances from 1 to 2% of the cadmium salt is effective. In some instances, however, it may be desirable to use percentages as high as 5% or greater and the present invention is not intended to be limited to any particular quantity.

The following is a representative example of a composition which has been found to be particularly effective as a deodorant and also as a fungicidal and fungistatic preparation.

| | Parts |
|---|---|
| Cadmium chloride | 1–2 |
| Wetting agent | 1–2 |
| Alcohol (30%) | 98–96 |

The liquid composition described above has been used effectively for treating ring worm, "athlete's foot," scalp infections, and similar fungus infections. The composition has also been found to be particularly effective in the prevention of undesirable body odors, including bromidrosis, a particularly malodorous condition of the feet.

While it has not been definitely determined, it is believed that the wetting agent in the above fluid preparation is an important feature in obtaining satisfactory results, and while the small amount of wetting agent appears to be extremely beneficial, it is of importance to keep the content of the wetting agent somewhat below or near its molecular equivalent with respect to the content of the cadmium salt. Any suitable wetting agent having the desired solubility in such compositions may be employed, including those classified as fatty alcohol sulfates, sulfated fatty acid amides, sulfated fatty acid esters, secondary alcohol sulfates, sulfated esters of higher alcohols and dibasic acids, alkylaryl sulfonates, and sulfonated esters of alcohols and dibasic acids, as well as salts of the various wetting agents. Particularly good results have been obtained using wetting agents of the last-mentioned class of which the dioctyl ester of sulfosuccinic acid is representative and the sodium salt of which is a preferred wetting agent. Ethyl alcohol was employed in the above composition; however, it is to be understood that propyl alcohol, either the normal or isopropyl or mixtures of these with ethyl alcohol may be employed and also ethyl alcohol denatured according to some U. S. Government formula approved for external use may be used.

What I claim is:

1. A pharmaceutical composition comprising an aqueous alcoholic solution of a cadmium salt and a wetting agent, said composition having fungicidal, fungistatic, and deodorizing properties.

2. A pharmaceutical composition comprising an aqueous alcoholic solution containing cadmium chloride and sodium dioctylsulfosuccinate.

3. A pharmaceutical composition for topical application having fungicidal, fungistatic, and deodorizing properties, said composition containing approximately 1 part of cadmium chloride, 1 part of a wetting agent, and 98 parts of 30% ethyl alcohol.

4. A pharmaceutical composition for topical application having fungicidal, fungistatic, and deodorizing properties, said composition containing approximately 1 part of cadmium chloride, 1 part of sodium dioctylsulfosuccinate, and 98 parts of 30% ethyl alcohol.

ARTHUR F. COCA.